(12) United States Patent
Chen et al.

(10) Patent No.: US 7,715,484 B2
(45) Date of Patent: May 11, 2010

(54) ORTHOGONAL FREQUENCY DIVISION MULTIPLEXING WITH PN-SEQUENCE

(75) Inventors: Yun-Yen Chen, Hsinchu (TW); Chih-Peng Li, Hsinchu (TW); Wei-Wen Hu, Hsinchu (TW)

(73) Assignee: Industrial Technology Research Institute, Chu-Tung, Hsinchu (TW)

( * ) Notice: Subject to any disclaimer, the term of this patent is extended or adjusted under 35 U.S.C. 154(b) by 832 days.

(21) Appl. No.: 11/298,184

(22) Filed: Dec. 9, 2005

(65) Prior Publication Data
US 2007/0036234 A1 Feb. 15, 2007

(30) Foreign Application Priority Data
Aug. 10, 2005 (TW) ................................ 94127134 A

(51) Int. Cl.
*H04K 1/10* (2006.01)
(52) U.S. Cl. ..................... 375/260; 375/259; 375/261; 375/267; 375/271; 375/279; 375/280; 375/329; 375/331; 375/338; 375/346; 375/347; 375/355; 375/359; 375/362; 375/371; 370/206; 370/208; 370/210; 370/503; 370/509; 370/516
(58) Field of Classification Search ......... 375/259–261, 375/267, 271, 279, 280, 329, 331, 338, 346, 375/347, 355, 359, 362, 371; 370/206, 208, 370/210, 503, 509, 516
See application file for complete search history.

(56) References Cited

U.S. PATENT DOCUMENTS 5,889,759 A 3/1999 McGibney

| 6,891,792 | B1 * | 5/2005 | Cimini et al. | 370/206 |
|---|---|---|---|---|
| 7,072,289 | B1 * | 7/2006 | Yang et al. | 370/208 |
| 2005/0052989 | A1 | 3/2005 | Tao et al. | |
| 2006/0045001 | A1 * | 3/2006 | Jalali | 370/208 |
| 2009/0045001 | A1 * | 2/2009 | Parigger | 180/248 |

FOREIGN PATENT DOCUMENTS

| TW | 560148 | 11/2003 |
|---|---|---|
| TW | 567689 | 12/2003 |

OTHER PUBLICATIONS

Van De Beek et al. "ML Estimation of Time and Frequency Offset in OFDM Systems" *IEEE Transactions on Signal Processing* (1997) vol. 45, No. 7, pp. 1800-1805.

(Continued)

*Primary Examiner*—David C Payne
*Assistant Examiner*—Zewdu Kassa
(74) *Attorney, Agent, or Firm*—Ladas & Parry LLP

(57) ABSTRACT

The invention relates to an orthogonal frequency division multiplexing system with PN-sequence. In the synchronization of the invention, both timing offset and frequency offset are estimated and compensated by utilizing a time and frequency synchronization device. In addition, the PN-sequence with the cyclic prefix is added to the OFDM symbol before transmitting. The time and frequency synchronization device of the invention comprises two synchronization circuits from the cyclic prefix and PN-sequence when calculating the timing offset and frequency offset of receiving signal. As a result, the OFDM system of the invention not only has better performance in fading channel, but also has the better bandwidth utilization without extra bandwidth for transmitting the PN-sequence.

7 Claims, 8 Drawing Sheets

OTHER PUBLICATIONS

Schmidl, T.M. et al. "Robust Frequency and Timing Synchroniztion for OFDM" *IEEE Transactions on Communications* (1997) vol. 45, No. 12, pp. 1613-1621.

Moose P.H. "A Technique for Orthogonal Frequency Division Multiplexing Frequency Offset Correction" *IEEE Transactions on Communications* (1994) vol. 42, No. 10, pp. 2908-2914.

Landstrom, D. et al. "Symbol Time Offset Estimation in Coherent OFDM Systems" *IEEE Transactions on Communications* (2002) vol. 50, No. 4, pp. 545-549.

Yang, et al., "A Robust Joint Estimator for OFDM Timing and Frequency Offsets Based on PN Codes", Consumer Communication and Networking Conference, 2005, 2005 Second IEEE Jan. 3-6, 2005, pp. 577-579, Aug. 2004.

Yan, et al., "OFDM Frequency Offset Estimator Using PN Sequences and Its Improvement", Vehicular Technology Conference, 2003 IEEE 58$^{th}$ vol. 2, Oct. 6-9, 2003, pp. 1196-1198, Mar. 2003.

Yan, Chunlin, et al., "OFDM Synchronization Using PN Sequence and Its Performance", The 14$^{th}$ IEEE 2003 International Symposium on Personal, Indoor and Mobile Radio Communication Proceedings, vol. 1, pp. 936-939, Sep. 2003.

\* cited by examiner

ORTHOGONAL FREQUENCY DIVISION MULTIPLEXING WITH PN-SEQUENCE

BACKGROUND OF THE INVENTION

1. Field of the Invention

The present invention relates to an orthogonal frequency division multiplexing system, and particularly, to an orthogonal frequency division multiplexing system with PN-sequence.

2. Description of the Related Art

A large number of references related to the orthogonal frequency division multiplexing (OFDM) synchronization algorithm exist, and can be divided into the time domain and the frequency domain according to the types of solution, i.e. before and after the Inverse Fast Fourier Transform (IFFT), or into the Non-Data-Aided (also known as blind estimation) and Data-Aided according to data mode, both of which usually use training symbols or cyclic prefixes, pilot symbols and so on.

The concept of using the cyclic prefix is mainly that every OFDM symbol has periodicity after being added with a cyclic prefix, so we only need to use a correlator to estimate the correlation of the cyclic prefixes in the OFDM symbols, and through the Maximum Likelihood Estimation Algorithm, easily calculate the starting point of each OFDM symbol and the offset of carrier frequency as described in the prior related art reference (1) J. J. van de Beek, M. Sandel, and P. O. Borjesson, "ML estimation of timing and frequency offset in OFDM systems," IEEE Trans. Signal Processings, vol. 45, pp. 1800-1805, July 1997 and U.S. Pat. No. 5,889,759.

The concept of using the training symbol to perform synchronization is that the two PN-sequences in the frequency domain may become periodic time domain signals after passing the IFFT at a transmitting terminal, and the synchronization of timing offset can be accomplished by acquiring the timing metric for estimating time through the operation of the correlation and calculating the maximum of the timing metric though the Maximum Likelihood Estimation Algorithm. In addition, the concept of using the timing metric to estimate the frequency offset is mainly that the first training symbol is the equal data of N/2 length in the timing domain, and thus the frequency offset can make the two equal data have a phase shift expressed by $\phi=\pi\hat{\epsilon}$, in which $\hat{\epsilon}$ is the frequency offset to be estimated. Therefore, the estimation of frequency offset can be accomplished by just calculating the angle of timing metric and dividing the angle by $\pi$ as described in the prior related art references (2) Schmidl, T. M. and Cox, D. C., "Robust frequency and timing synchronization for OFDM", IEEE Transactions on Communications, vol. 45, pp. 1613-1621, December 1977.; (3) P. H. Moose, "A technique for orthogonal frequency division multiplexing frequency offset correction," IEEE Trans. Commun., vol. 42, pp. 2908-2914, October 1994 and Republic of China Patent Nos. 567689 and No. 560148.

In addition, in the prior related art reference (4) Landstrom, D., Wilson, S. K., van de Beek, J.-J., Odling, P., Borjesson, P. O., "Symbol time offset estimation in coherent OFDM systems," IEEE Transactions on Communications, vol. 50, pp. 545-549, April 2002, the methods of the pilot symbol and the cyclic prefix are combined. Though the synchronization method just based on the cyclic prefix can be improved, the position of the pilot symbol must be arranged properly, thereby achieving a better performance.

The methods mentioned above are all data-aided methods. Though the method is of less complexity, due to the addition of extra data, the bandwidth utilization is lowered consequently, which is the biggest disadvantage of using the conventional data-aided method.

Therefore, it is necessary to provide an orthogonal frequency division multiplexing system to solve the above problems.

SUMMARY OF THE INVENTION

The invention relates to an orthogonal frequency division multiplexing system with PN-sequence. The orthogonal frequency division multiplexing system comprises a modulate circuit, an Inverse Fast Fourier Transformer, a PN-sequence generating circuit, a cyclic prefix inserter, a first adder, a time and frequency synchronization device, a cyclic prefix remover, a Fast Fourier Transformer and a demodulate circuit.

The modulate circuit is used to modulate a signal to be transmitted to a complex number frequency domain signal at a transmitting terminal. The Inverse Fast Fourier Transformer is used to transform the complex number frequency domain signal at the transmitting terminal to a complex number time domain signal at the transmitting terminal. The PN-sequence generating circuit is used to generate a PN-sequence signal. The cyclic prefix inserter is used to add cyclic prefixes to the complex number time domain signal at the transmitting terminal and the PN-sequence signal respectively. The first adder is used to sum up the complex number time domain signal at the transmitting terminal and the PN-sequence signal, both of which have cyclic prefixes, to form a transmitting signal. The time and frequency synchronization device is used to receive a receiving signal formed by the transmitting signal though a channel, and for calculating and compensating the timing offset and frequency offset of the receiving signal. The cyclic prefix remover is used for removing the cyclic prefix of the receiving signal after compensated by the time and frequency synchronization device. The Fast Fourier Transformer is used for transforming the receiving signal with the cyclic prefix removed to a complex number frequency domain signal at a receiving terminal. The demodulate circuit is used for demodulating the complex number frequency domain signal at the receiving terminal to a receiving terminal signal.

The orthogonal frequency division multiplexing system of the invention is to add a PN-sequence with cyclic prefix to each OFDM symbol before transmitting. The time and frequency synchronization device of the invention comprises two synchronization circuits from the cyclic prefix and PN-sequence during calculating the timing offset and frequency offset of receiving signal. As a result, the OFDM system of the invention not only has better performance in fading channel, but also has better bandwidth utilization without extra bandwidth for transmitting the PN-sequence. Therefore, the architecture of the orthogonal frequency division multiplexing system of the invention may be better than that of the conventional synchronization system, which just utilizes the cyclic prefix. Moreover, to add PN-sequence to each OFDM signal will not decrease the bandwidth utilization but will optimize the performance of synchronization at the receiving terminal.

DETAILED DESCRIPTION OF THE INVENTION

Figure 1:
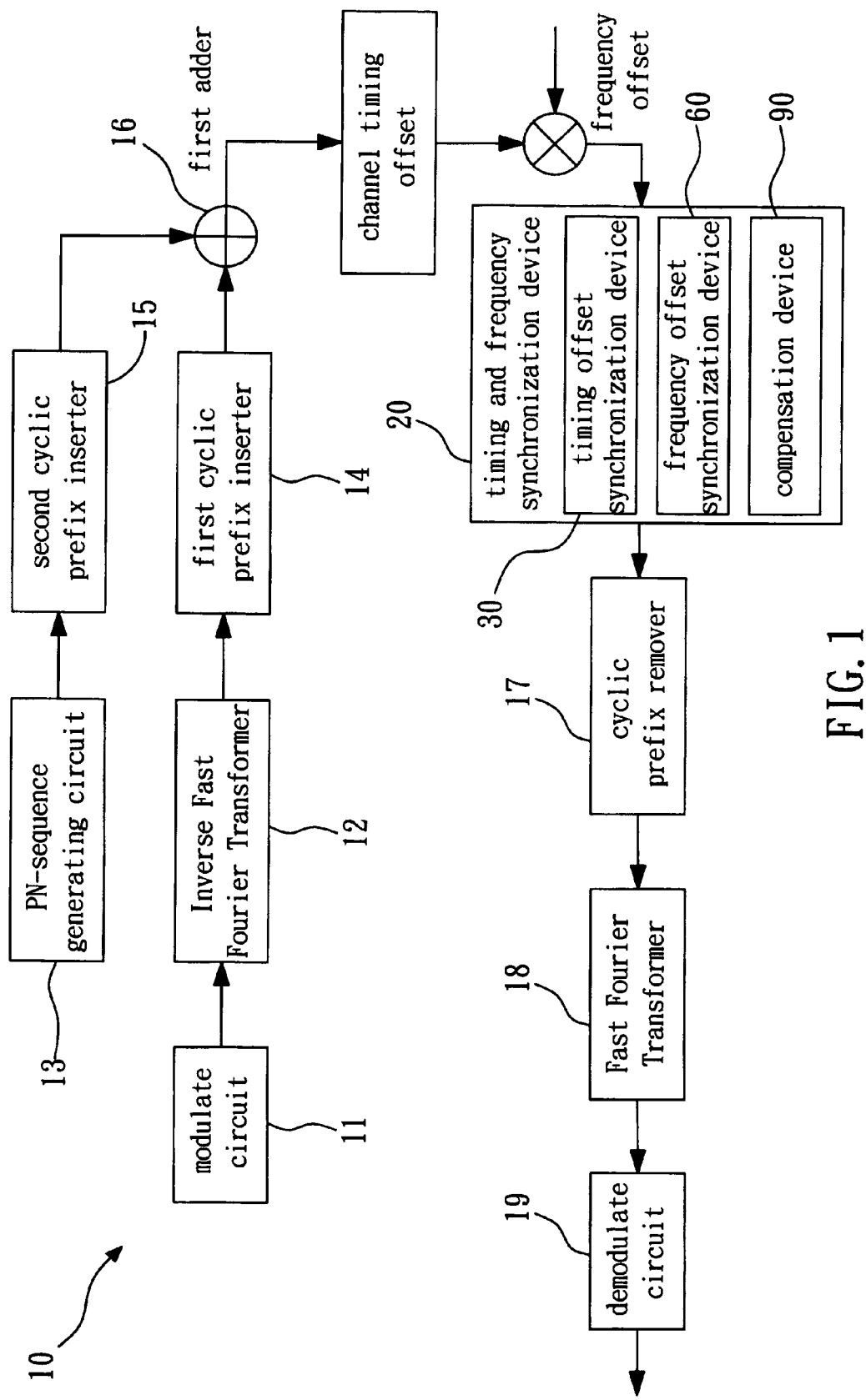
FIG. 1 is a schematic diagram of the orthogonal frequency division multiplexing system of the invention.

Referring to FIG. 1, it shows a schematic diagram of the orthogonal frequency division multiplexing system of the invention. The orthogonal frequency division multiplexing system 10 of the invention includes a modulate circuit 11, an Inverse Fast Fourier Transformer 12, a PN-sequence generating circuit 13, a first cyclic prefix inserter 14, a second cyclic prefix inserter 15, a first adder 16, a time and frequency synchronization device 20, a cyclic prefix remover 17, a Fast Fourier Transformer 18 and a demodulate circuit 19.

The modulate circuit 11 is used to modulate a signal to be transmitted to a complex number frequency domain signal at a transmitting terminal. The Inverse Fast Fourier Transformer 12 is used to transform the complex number frequency domain signal at the transmitting terminal to a complex number time domain signal at a transmitting terminal. The PN-sequence generating circuit 13 is used to generate a PN-sequence signal. The first cyclic prefix inserter 14 is used to add cyclic prefixes to the complex number time domain signal at the transmitting terminal. The second cyclic prefix inserter 15 is used to add the cyclic prefix to the PN-sequence signal. The first adder 16 is used to sum up the complex number time domain signal at the transmitting terminal and the PN-sequence signal, both of which have cyclic prefixes, to form a transmitting signal.

Figure 2:
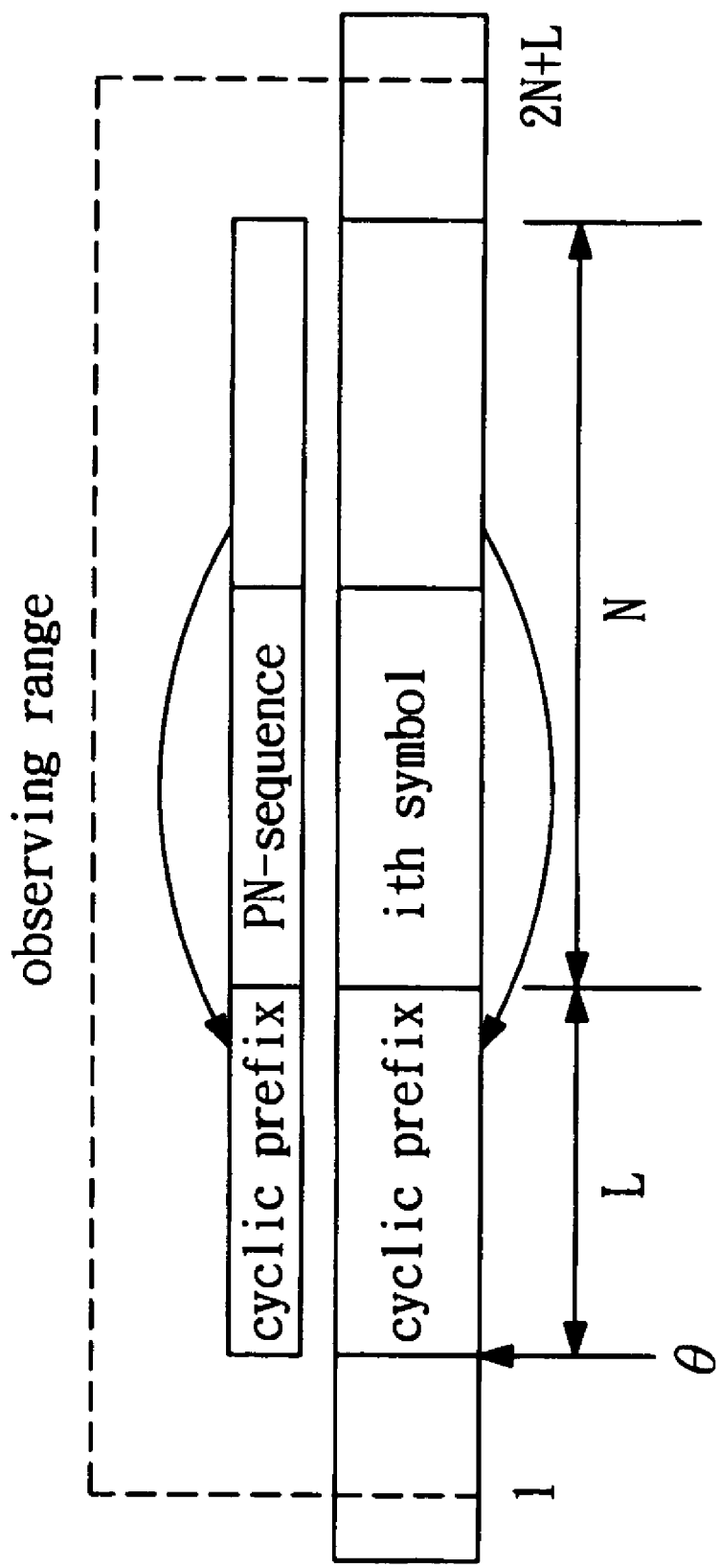
FIG. 2 is a schematic diagram of the OFDM symbols of the invention.

Referring to FIG. 2, it shows the orthogonal frequency division multiplexing system of the invention, in which a PN-sequence with cyclic prefix is added to each OFDM symbol before transmitting, and the transmitted signal is shown in FIG. 2. The length of the cyclic prefix is L. The length of IFFT is N. The start point of the OFDM symbol is $\theta$. Under this architecture, the orthogonal frequency division multiplexing system of the invention observes the 2N+L sampling point of the receiving signal by using the Maximum Likelihood Estimation Algorithm.

Referring to FIG. 1 again, the transmitting signal forms a receiving signal though a channel (timing offset) and frequency offset. The time and frequency synchronization device 20 is used for receiving the receiving signal and for calculating and compensating the timing offset and frequency offset of the receiving signal. It includes a timing offset synchronization device 30, a frequency offset synchronization device 60 and a compensation device 90. The timing offset synchronization device 30 is used for calculating the timing offset of the receiving signal, and the frequency offset synchronization device 60 is used for calculating the frequency offset of the receiving signal and the compensation device 90 is for compensating the receiving signal according to the timing offset and the frequency offset.

Figure 3:
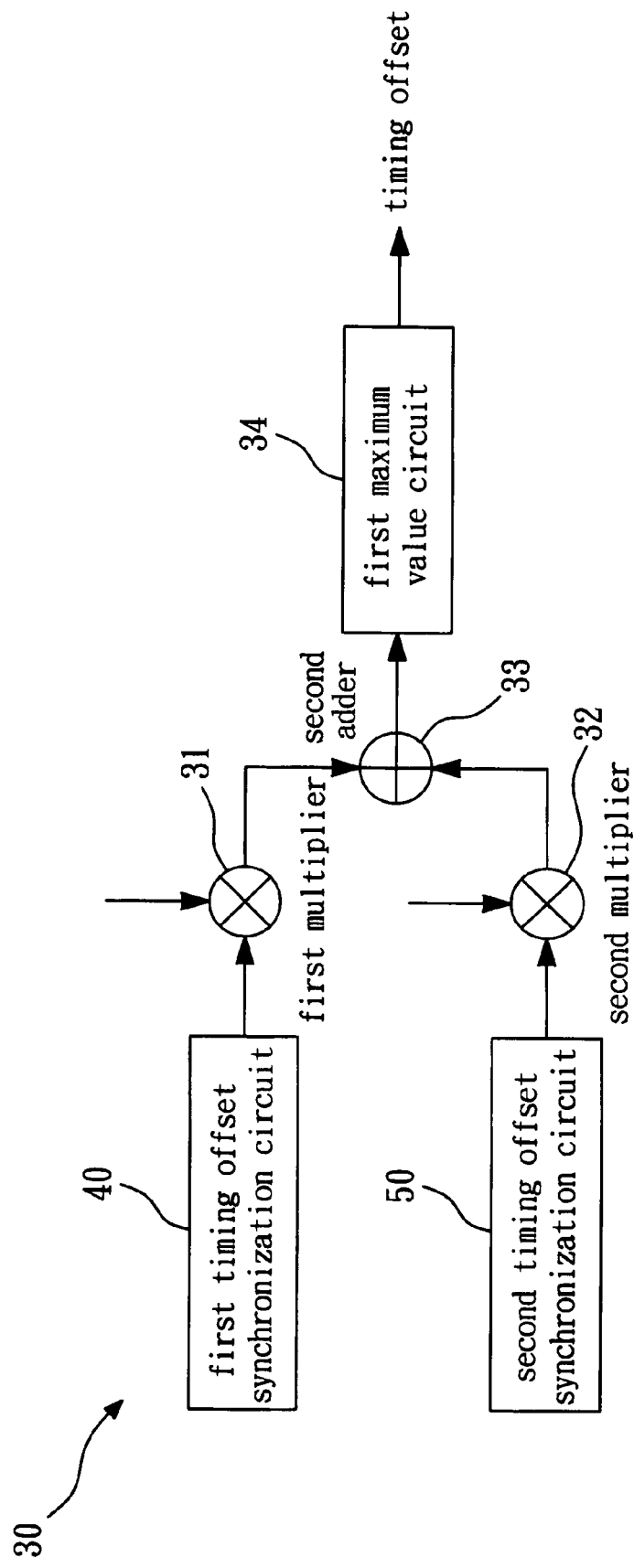
FIG. 3 is a schematic diagram of the timing offset synchronization device of the invention.

Referring to FIG. 3, it shows a schematic diagram of the timing offset synchronization device 30 of the invention. The timing offset synchronization device 30 includes a first timing offset synchronization circuit 40, a second timing offset synchronization circuit 50, a first multiplier 31, a second multiplier 32, a second adder 33 and a first maximum value circuit 34. The timing offset synchronization device 30 calculates the timing offset according to the following equation (1) which is derived from MLE criterion:

$$\hat{\theta} = \underset{\theta}{\operatorname{argmax}}\{\Lambda_\theta\} = \underset{\theta}{\operatorname{argmax}}\{\rho\Lambda_\theta^{CP} + \alpha(1-\rho)\Lambda_\theta^{PN}\}. \quad (1)$$

where $\alpha$ is the channel amplitude response, $\rho=\beta^2\text{SNR}/(\beta^2\text{SNR}+1)$ and SNR is the signal to noise ratio. According to equation (1), the proposed timing synchronization method is based on the SNR level. For a large signal to noise ratio, the estimation chiefly relies on the cyclic prefix ($\Lambda_\theta^{CP}$), whereas for a low SNR, the estimator depends on the information of the PN sequence ($\Lambda_\theta^{PN}$).

The first timing offset synchronization circuit 40 is for generating a first timing metric ($\Lambda_\theta^{CP}$) formed by the cyclic prefix. The second timing offset synchronization circuit 50 is used for generating a second timing metric ($\Lambda_\theta^{PN}$) formed by the PN-sequence. The first multiplier 31 is used for multiplying the first timing metric by a first coefficient $\rho$ to get $\rho\Lambda_\theta^{CP}$. The second multiplier 32 is used for multiplying the second timing metric by a second coefficient $\alpha(1-\rho)$ to get $\alpha(1-\rho)\Lambda_\theta^{PN}$. The second adder 33 is used for adding the first timing metric multiplied by the first coefficient $\rho$ and the second timing metric multiplied by the second $\alpha(1-\rho)$. The first maximum value circuit 34 is used for obtaining the maximum, i.e.

$$\underset{\theta}{\operatorname{argmax}}\{\}$$

in the equation (1) representing obtaining the maximum for the parameter in the bracket, for the output of the second adder 33 to calculate the timing offset of the receiving signal. In addition, the first timing offset synchronization circuit 40 and the second timing offset synchronization circuit 50 are described in detail respectively as follows.

Figure 4:
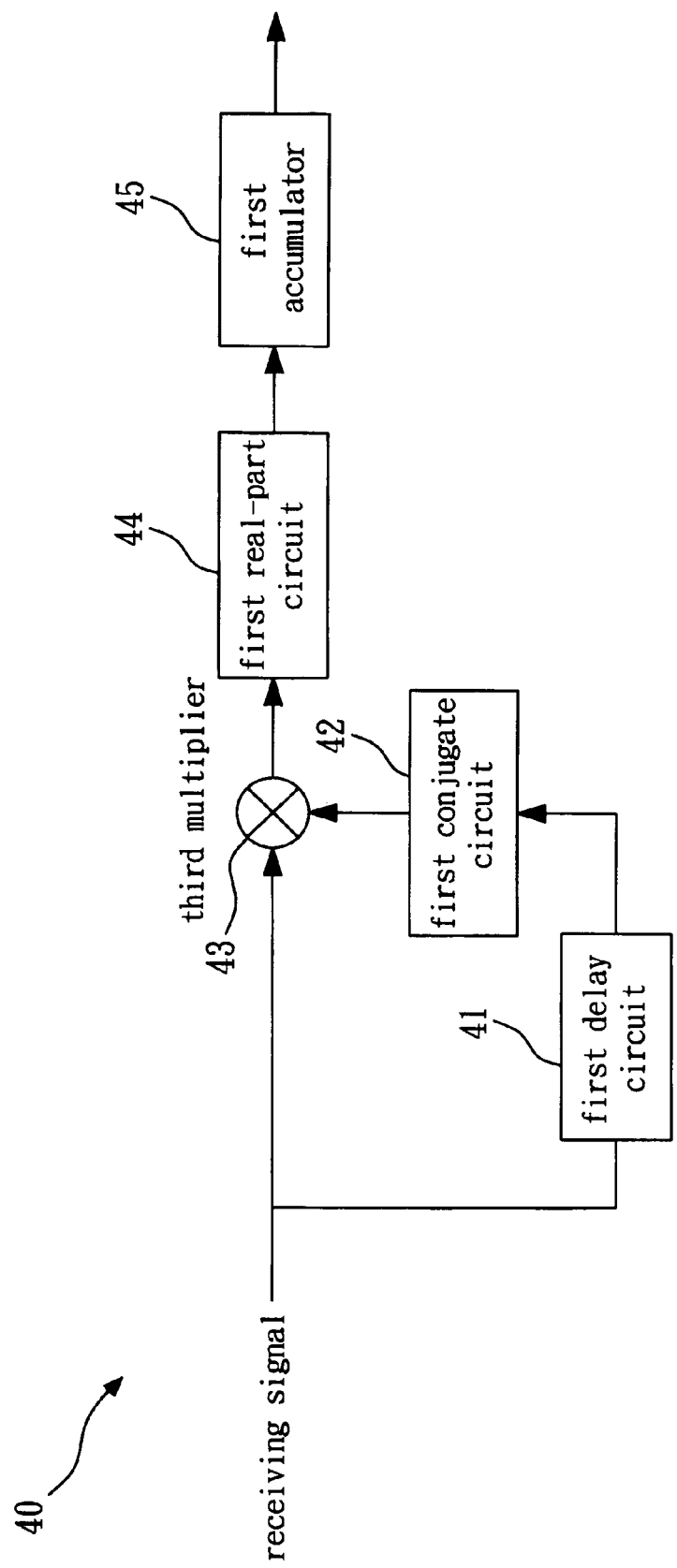
FIG. 4 is a schematic diagram of the first timing offset synchronization circuit of the invention.

Referring to FIG. 4, it shows a schematic diagram of the first timing offset synchronization circuit 40 of the invention. The first timing offset synchronization circuit 40 includes a first delay circuit 41, a first conjugate circuit 42, a third multiplier 43, a first real-part circuit 44 and a first accumulator 45. The first timing offset synchronization circuit 40 calculates the first timing metric ($\Lambda_\theta^{CP}$) according to the following equation (2):

$$\Lambda_\theta^{CP} = \sum_{k=\theta}^{\theta+L-1} \operatorname{Re}(r_k r_{k+N}^*). \quad (2)$$

The equation (2) is obtained by neglecting all the constant terms of the equation (1) because they are not relevant to the maximization of the log-likelihood function.

From the equation (2), it will be known that the signal $r_k$ must be multiplied by the conjugate signal $r_{k+N}^*$ delayed time N, and then the real-part is taken after multiplying and accumulated by length L. Therefore, the first delay circuit 41 is used for delaying the receiving signal $r_k$ for a first predetermined time (N). The first conjugate circuit 42 is used for obtaining the complex conjugate $r_{k+N}^*$ of the delayed receiving signal. The third multiplier 43 is used for multiplying the receiving signal $r_k$ without being delayed and the output signal $r_{k+N}^*$ of the first conjugate circuit to obtain $r_k r_{k+N}^*$. The first real-part circuit 44 is used for obtaining the real-part Re $(r_k r_{k+N}^*)$ of the complex number output signal of the third multiplier 43. The first accumulator 45 is used for accumulating the output signal of the first real-part circuit 44 and a plurality of time points to calculate the first timing metric, in which the number accumulated is the length (L) of the cyclic prefix.

Figure 5:
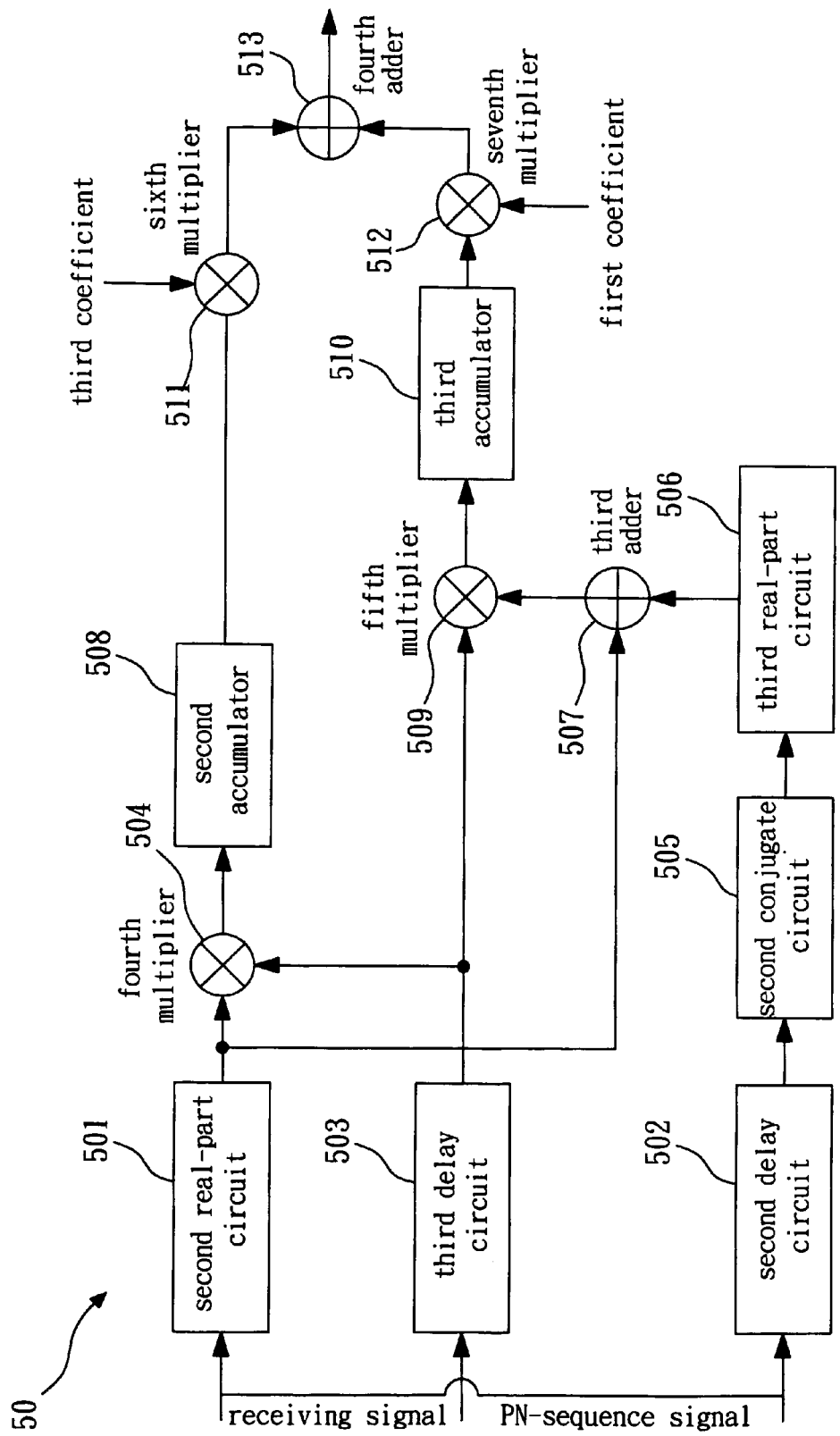
FIG. 5 is a schematic diagram of the second timing offset synchronization circuit of the invention.

Referring to FIG. 5, it shows a schematic diagram of the second timing offset synchronization circuit 50 of the invention. The second timing offset synchronization circuit 50 includes a second real-part circuit 501, a second delay circuit 502, a third delay circuit 503, a fourth multiplier 504, a second conjugate circuit 505, a third real-part circuit 506, a third adder 507, a second accumulator 508, a fifth multiplier 509, a third accumulator 510, a sixth multiplier 511, a seventh multiplier 512 and a fourth adder 513. The second timing offset synchronization circuit 50 calculates the second timing metric $(\Lambda_\theta^{PN})$ according to the following equation (3):

$$\Lambda_\theta^{PN} = (1+\rho) \sum_{k=\theta}^{\theta+N+L-1} p_{k-\theta} \text{Re}(r_k) - \rho \sum_{k=\theta}^{\theta+L-1} p_{k-\theta} \begin{bmatrix} \text{Re}(r_k) + \\ \text{Re}(r_{k+N}^*) \end{bmatrix}. \quad (3)$$

The second real-part circuit 501 is used for obtaining the real-part Re $(r_k)$ of the complex number receiving signal. The second delay circuit 502 is used for delaying the complex number receiving signal $r_k$ for a first predetermined time (N), and obtaining the complex conjugate $r_{k+N}^*$ of the output complex signals of the second delay circuit 502 through the second conjugate circuit 505. The third delay circuit 503 is used for delaying the PN-sequence receiving signal $p_k$ of the receiving signal for a second predetermined time ($\theta$) to obtain $p_{k-\theta}$. The fourth multiplier 504 is used for multiplying the output signal of the second real-part circuit 501 and the output signal of the third delay circuit 503 to obtain $p_{k-\theta}$ Re $(r_k)$.

The second accumulator 508 is used for accumulating the output of the fourth multiplier 504 by a plurality of lengths, in which the number accumulated (L+N) is the length (L) of the cyclic prefix plus the first predetermined time (N). The sixth multiplier 511 is used for multiplying the output signal of the second accumulator 508 by a third coefficient (1+$\rho$) to obtain the former half part $$(1+\rho) \sum_{k=\theta}^{\theta+N+L-1} p_{k-\theta} \text{Re}(r_k)$$

of the above equation (3).

The third real-part circuit 506 is used for obtaining the real-part Re $(r_{k+N}^*)$ of the complex number output signal of the second conjugate circuit 505. The third adder 507 is used for adding the output signal of the second real-part circuit 501 and the output signal of the third real-part circuit 506 to obtain Re $(r_k)$+Re $(r_{k+N}^*)$. The fifth multiplier 509 is used for multiplying the output signal of the third adder 507 and the output signal of the third delay circuit 503 to obtain $p_{k-\theta}$ [Re $(r_k)$+Re $(r_{k+N}^*)$]. The third accumulator 510 is used for accumulating the output signal of the fifth multiplier 509 by a plurality of lengths, in which the number accumulated is the length (L) of the cyclic prefix. The seventh multiplier 512 is used for multiplying the output signal of the third accumulator 510 by the first coefficient $\rho$ to obtain the latter half part $$\rho \sum_{k=\theta}^{\theta+L-1} p_{k-\theta}[\text{Re}(r_k) + \text{Re}(r_{k+N}^*)]$$

of the equation (3). The fourth adder 513 is used for adding the output signal of the sixth multiplier 511 and the output signal of the seventh multiplier 512 to calculate the second timing metric $(\Lambda_\theta^{PN})$.

Figure 6:
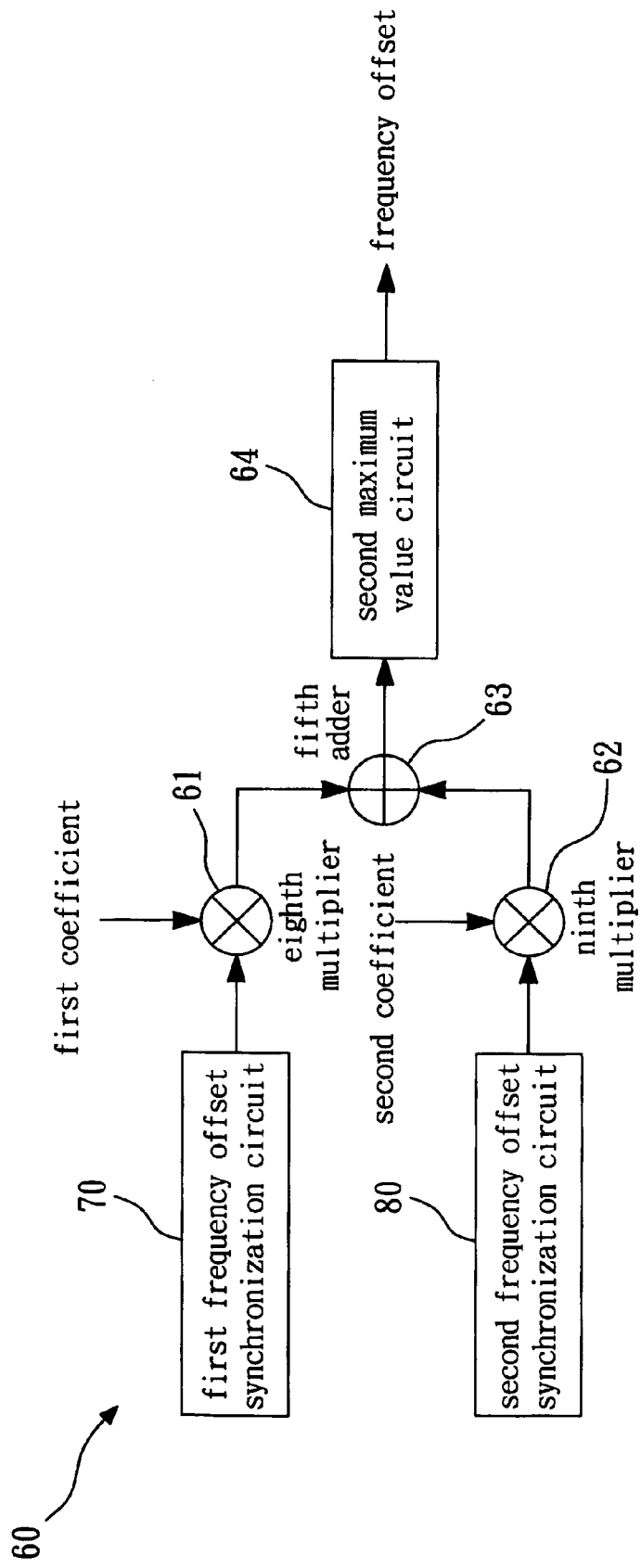
FIG. 6 is a schematic diagram of the frequency offset synchronization device of the invention.

Referring to FIG. 6, it shows a schematic diagram of the frequency offset synchronization device 60 of the invention. The frequency offset synchronization device 60 includes a first frequency offset synchronization circuit 70, a second frequency offset synchronization circuit 80, an eighth multiplier 61, a ninth multiplier 62, a fifth adder 63, a second maximum value circuit 64. The frequency offset synchronization circuit 60 calculates the frequency offset according to the following equation (4) which is derived from MLE criterion:

$$\hat{\varepsilon} = \arg\max_\varepsilon \{\Lambda_\varepsilon\} = \arg\max_\varepsilon \{\rho\Lambda_\varepsilon^{CP} + \alpha(1-\rho)\Lambda_\varepsilon^{PN}\}. \quad (4)$$

where $\rho$ and $\alpha$ are defined in equation (1). From equation (4), it is obvious that the performance of the derived frequency offset estimator is highly dependent on SNR. For a large signal to noise ratio, the estimation chiefly relies on the cyclic prefix $(\Lambda_\varepsilon^{CP})$, whereas for a low SNR, the estimator depends on the information of the PN sequence $(\Lambda_\varepsilon^{PN})$.

The first frequency offset synchronization circuit 70 is used for generating a first frequency offset metric $(\Lambda_\varepsilon^{CP})$ formed by the cyclic prefix. The second frequency offset synchronization circuit 80 is used for generating a second frequency offset metric $(\Lambda_\varepsilon^{PN})$ formed by the PN-sequence. The eighth multiplier 61 is used for multiplying the first frequency offset metric by a first coefficient $\rho$ to obtain $\rho\Lambda_\varepsilon^{CP}$. The ninth multiplier 62 is used for multiplying the second frequency offset metric by a second coefficient $\alpha(1-\rho)$ to obtain $\alpha(1-\rho)\Lambda_\varepsilon^{PN}$. The fifth adder 63 is used for adding the first frequency offset metric multiplied by the first coefficient $\rho$ and the second frequency offset metric multiplied by the second coefficient $\alpha(1-\rho)$. The second maximum value circuit 64 is used for obtaining the maximum, i.e.

$$\arg\max_\theta \{\ \}$$

in the equation (4) representing obtaining the maximum for the parameter within the bracket, of the output of the fifth adder 63 to calculate the frequency offset of the receiving signal. In addition, the first frequency offset synchronization circuit 70 and the second frequency offset synchronization circuit 80 are described in detail respectively as follows.

Figure 7:
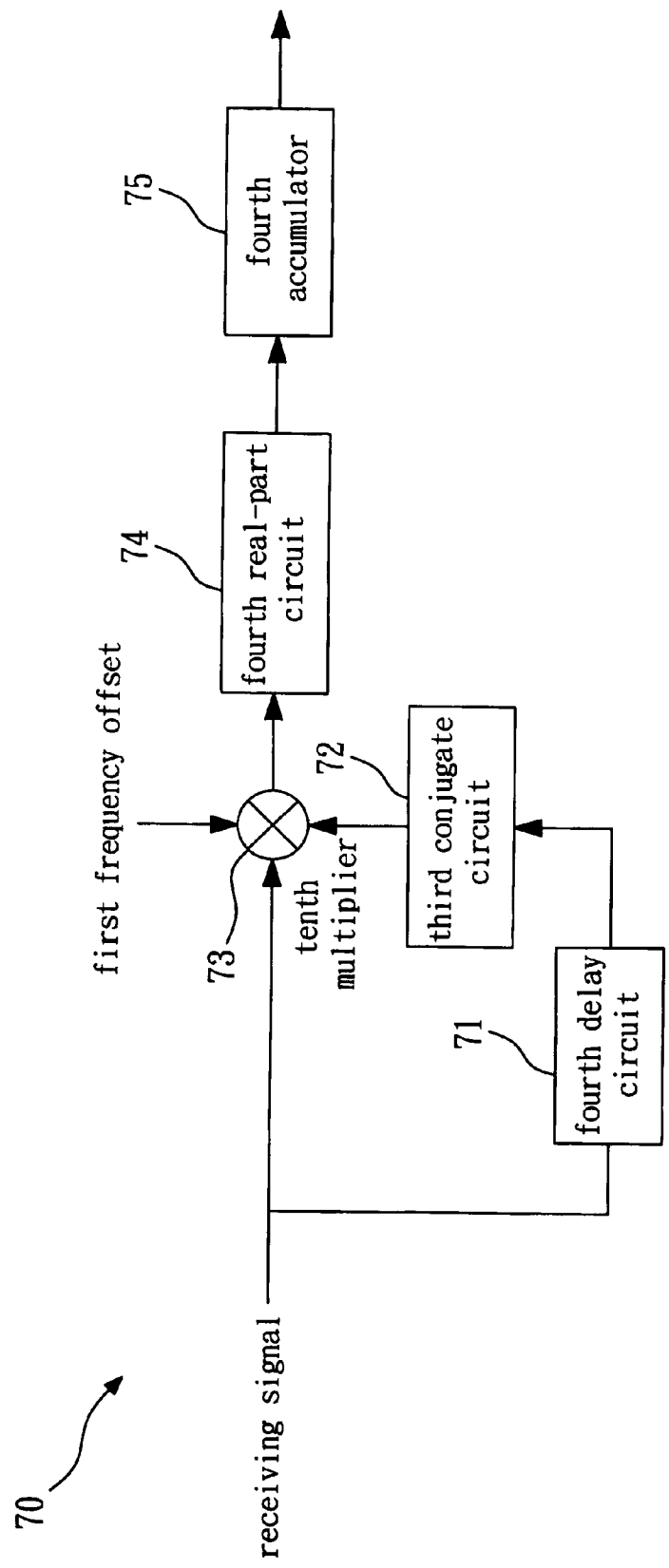
FIG. 7 is a schematic diagram of the first frequency offset synchronization circuit of the invention.

Referring to FIG. 7, it shows a schematic diagram of the first frequency offset synchronization circuit 70 of the invention. The first frequency offset synchronization circuit 70 includes a fourth delay circuit 71, a third conjugate circuit 72, a tenth multiplier 73, a fourth real-part circuit 74 and a fourth accumulator 75. The first frequency offset synchronization circuit 70 calculates the first frequency offset metric ($\Lambda_\epsilon^{CP}$) according to the following equation (5):

$$\Lambda_\epsilon^{CP} = \sum_{k=\theta}^{\theta+L-1} \text{Re}(r_k r_{k+N}^* e^{j2\pi\epsilon}). \quad (5)$$

The fourth delay circuit 71 is used for delaying the receiving signal $r_k$ for a first predetermined time (N). The third conjugate circuit 72 is used for obtaining complex conjugate $r_{k+N}^*$ of the delayed receiving signal. The tenth multiplier 73 is used for multiplying the receiving signal $r_k$ without being delayed, the output signal $r_{k+N}^*$ of the third conjugate circuit 72 and a first frequency offset item $e^{j2\pi\epsilon}$. The fourth real-part circuit 74 is used for obtaining the real-part of the complex number output signal of the tenth multiplier 73. The fourth accumulator 75 is used for accumulating the output signal of the fourth real-part circuit 74 by a plurality of time points to calculate the first frequency offset metric ($\Lambda_\epsilon^{CP}$), in which the number accumulated is the length (L) of the cyclic prefix.

Figure 8:
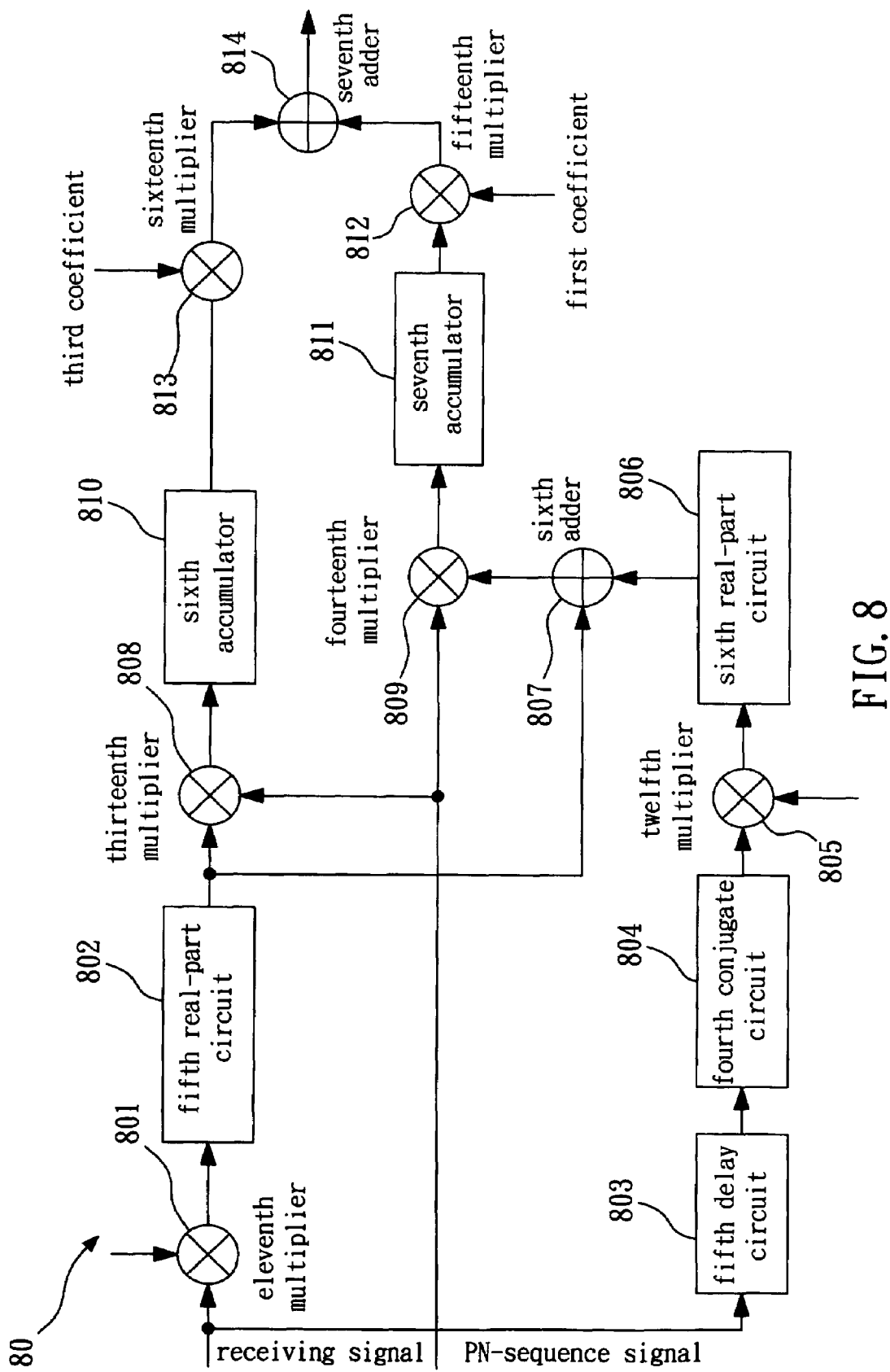
FIG. 8 is a schematic diagram of the second frequency offset synchronization circuit of the invention.

Referring to FIG. 8, it shows a schematic diagram of the second frequency offset synchronization circuit 80 of the invention. The second frequency offset synchronization circuit 80 includes an eleventh multiplier 801, a fifth real-part circuit 802, a fifth delay circuit 803, a fourth conjugate circuit 804, a twelfth multiplier 805, a sixth real-part circuit 806, a sixth adder 807, a thirteenth multiplier 808, a fourteenth multiplier 809, a sixth accumulator 810, a seventh accumulator 811, a fifteenth multiplier 812, a sixteenth multiplier 813 and a seventh adder 814. The second frequency offset synchronization circuit 80 calculates the second frequency offset metric ($\Lambda_\epsilon^{PN}$) according to the following equation (6):

$$\Lambda_\epsilon^{PN} = \quad (6)$$
$$(1+\rho) \sum_{k=\theta}^{\theta+N+L-1} p_k \text{Re}\left(r_k e^{\frac{-j2\pi\epsilon k}{N}}\right) - \rho \sum_{k=\theta}^{\theta+L-1} p_k \left[ \begin{array}{l} \text{Re}\left(r_k e^{\frac{-j2\pi\epsilon k}{N}}\right) + \\ \text{Re}\left(r_{k+N}^* e^{\frac{j2\pi\epsilon(k+N)}{N}}\right) \end{array} \right].$$

The eleventh multiplier 801 is used for multiplying the receiving signal $r_k$ by a second frequency offset item $e^{-j2\pi\epsilon k/N}$. The fifth real-part circuit 802 is used for obtaining the real-part for the complex number signal output by the eleventh multiplier 801. The fifth delay circuit 803 is used for delaying the receiving signal $r_k$ for a first predetermined time (N). The fourth conjugate circuit 804 is used for obtaining the complex conjugate as $r_{k+N}^*$ of the output signal of the fifth delay circuit 803. The twelfth multiplier 805 is used for multiplying the output signal of the fourth conjugate circuit 804 by a third frequency offset item $e^{-j2\pi\epsilon(k+N)/N}$. The sixth real-part circuit 806 is used for obtaining the real-part $$\text{Re}\left(r_{k+N}^* e^{\frac{j2\pi\epsilon(k+N)}{N}}\right)$$

of the complex number signal output by the twelfth multiplier 805. The sixth adder 807 is used for adding the output signal of the fifth real-part circuit 802 and the output signal of the sixth real-part circuit 806 to obtain $$\text{Re}\left(r_k e^{\frac{-j2\pi\epsilon k}{N}}\right) + \text{Re}\left(r_{k+N}^* e^{\frac{j2\pi\epsilon(k+N)}{N}}\right).$$

The thirteenth multiplier 808 is used for multiplying the PN-sequence receiving signal $p_k$ of receiving signal and the output signal of the fifth real-part circuit 802 to obtain $$p_k \text{Re}\left(r_k e^{\frac{-j2\pi\epsilon k}{N}}\right).$$

The sixth accumulator 810 is used for accumulating the output signal of the thirteenth multiplier 808 by a plurality of lengths, in which the numbers (L+N) accumulated is the length (L) of the cyclic prefix plus the first predetermined time (N). The sixteenth multiplier 813 is used for multiplying the output of the sixth accumulator 810 by a third coefficient $$(1+\rho) \text{ to get } (1+\rho) \sum_{k=\theta}^{\theta+N+L-1} p_k \text{Re}\left(r_k e^{\frac{-j2\pi\epsilon k}{N}}\right).$$

The fourteenth multiplier 809 is used for multiplying the PN-sequence receiving signal $p_k$ of the receiving signal and the output signal of the sixth adder 807. The seventh accumulator 811 is used for accumulating the output signal of the fourteenth multiplier 809 by a plurality of lengths, in which the number accumulated is the length (L) of the cyclic prefix. The fifteenth multiplier 812 is used for multiplying the output signal of the seventh accumulator 811 by the first coefficient $\rho$ to obtain $$\rho \sum_{k=\theta}^{\theta+L-1} p_k \left[ \text{Re}\left(r_k e^{\frac{-j2\pi\epsilon k}{N}}\right) + \text{Re}\left(r_{k+N}^* e^{\frac{j2\pi\epsilon(k+N)}{N}}\right) \right].$$

The seventh adder 814 is used for adding the output signal of the fifteenth multiplier 812 by the output signal of the sixteenth multiplier 813 to calculate the second frequency offset metric ($\Lambda_\epsilon^{PN}$).

Referring to FIG. 1 again, the cyclic prefix remover 17 is used for removing the cyclic prefix of the receiving signal compensated by the time and frequency synchronization device after the time and frequency synchronization device 20 calculates and compensates the timing offset and frequency offset of the receiving signal. The Fast Fourier Transformer 18 is used for transforming the receiving signal with the cyclic prefix removed to a complex number frequency domain signal at a receiving terminal. The demodulate circuit 19 is used for demodulating the complex number frequency domain signals at the receiving terminal to a receiving terminal signal.

The orthogonal frequency division multiplexing system 10 of the invention is to add a PN-sequence with cyclic prefix to each OFDM symbol before transmitting. The time and frequency synchronization device 20 comprises two synchronization circuits from the cyclic prefix and PN-sequence during calculating the timing offset and frequency offset of receiving signal. As a result, the OFDM system 10 of the invention not only has better performance in fading channel, but also has the better bandwidth utilization without extra bandwidth for transmitting the PN-sequence. Therefore, the architecture of the orthogonal frequency division multiplexing system 10 of the invention may be better than that of the conventional synchronization system, which just utilizes the cyclic prefix. Moreover, to add PN-sequence to each OFDM signal will not decrease the bandwidth utilization, but will optimize the performance of synchronization at the receiving terminal.

While an embodiment of the present invention has been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. An orthogonal frequency division multiplexing system with PN-sequence, comprising:
   a modulate circuit, for modulating a transmitting terminal signal to a complex number frequency domain signal at a transmitting terminal;
   an Inverse Fast Fourier Transformer, for transforming the complex number frequency domain signal at the transmitting terminal to a complex number time domain signal at the transmitting terminal;
   a PN-sequence generating circuit, for generating a PN-sequence signal;
   a cyclic prefix inserter, for inserting cyclic prefixes to the complex number time domain signal at the transmitting terminal and the PN-sequence signal respectively;
   a first adder, for adding the complex number time domain signal having cyclic prefixes at the transmitting terminal and the PN-sequence signal having cyclic prefixes to form a transmitting signal;
   a time and frequency synchronization device, for receiving a receiving signal formed by the transmitting signal though a channel, and for calculating and compensating the timing offset and frequency offset of the receiving signal according to cyclic prefixes and the PN-sequence signal;
   a cyclic prefix remover, for removing the cyclic prefix of the receiving signal compensated by the time and frequency synchronization device;
   a Fast Fourier Transformer, for transforming the receiving signal without the cyclic prefix to a complex number frequency domain signal at a receiving terminal; and
   a demodulate circuit, for demodulating the complex number frequency domain signal at the receiving terminal to a receiving terminal signal,
   wherein
   the time and frequency synchronization device comprises a timing offset synchronization device, a frequency offset synchronization device, and a compensation device,
   the timing offset synchronization device is used for calculating the timing offset of the receiving signal,
   the frequency offset synchronization device is used for calculating the frequency offset of the receiving signal,
   and the compensation device is used for compensating the receiving signal according to the timing offset and the frequency offset,
   and wherein the timing offset synchronization device comprises:
   a first timing offset synchronization circuit, for generating a first timing metric formed by the cyclic prefix;
   a second timing offset synchronization circuit, for generating a second timing metric formed by the PN-sequence;
   a first multiplier, for multiplying the first timing metric by a first coefficient $\rho$;
   a second multiplier, for multiplying the second timing metric by a second coefficient $\alpha(1-\rho)$;
   a second adder, for adding the first timing metric multiplied by the first coefficient $\rho$ and the second timing metric multiplied by the second $\alpha(1-\rho)$; and
   a first maximum value circuit, for obtaining a maximum value among the output of the second adder to be the timing offset of the receiving signal.

2. The orthogonal frequency division multiplexing system according to claim 1, wherein the first timing offset synchronization circuit comprises:
   a first delay circuit, for delaying the receiving signal for a first predetermined time;
   a first conjugate circuit, for obtaining complex conjugate of the delayed receiving signal;
   a third multiplier, for multiplying the receiving signal without being delayed and the output signal of the first conjugate circuit;
   a first real-part circuit, for obtaining the real-part of the complex number output signal of the third multiplier; and
   a first accumulator, for accumulating the output signal of the first real-part circuit by a plurality of time points to calculate the first timing metric, wherein the number accumulated is the length of the cyclic prefix.

3. The orthogonal frequency division multiplexing system according to claim 1, wherein the second timing offset synchronization circuit comprises:
   a second real-part circuit, for obtaining the real-part of the complex number receiving signal;
   a second delay circuit, for delaying the complex number receiving signal for a first predetermined time;
   a third delay circuit, for delaying the PN-sequence receiving signal of the receiving signal for a second predetermined time;
   a fourth multiplier, for multiplying the output signal of the second real-part circuit and the output signal of the third delay circuit;
   a second conjugate circuit, for obtaining the complex conjugate of the complex number output signal of the second delay circuit;
   a third real-part circuit, for obtaining the real-part of the complex number output signal of the second conjugate circuit;
   a third adder, for adding the output signal of the second real-part circuit and the output signal of the third real-part circuit;
   a second accumulator, for accumulating the output of the fourth multiplier by a plurality of lengths, wherein the number accumulated is the length of the cyclic prefix plus the first predetermined time;
   a fifth multiplier, for multiplying the output signal of the third adder and the output signal of the third delay circuit;
   a third accumulator, for accumulating the output signal of the fifth multiplier by a plurality of lengths, wherein the number accumulated is the length of the cyclic prefix;
   a sixth multiplier, for multiplying the output signal of the second accumulator by a third coefficient $(1+\rho)$;
   a seventh multiplier, for multiplying the output signal of the third accumulator by the first coefficient $\rho$; and
   a fourth adder, for adding the output signal of the sixth multiplier and the output signal of the seventh multiplier to calculate the second timing metric.

4. The orthogonal frequency division multiplexing system according to claim 1, wherein the frequency offset synchronization device comprises:

a first frequency offset synchronization circuit, for generating a first frequency offset metric formed by the cyclic prefix;

a second frequency offset synchronization circuit, for generating a second frequency offset metric formed by the PN-sequence;

an eighth multiplier, for multiplying the first frequency offset metric by a first coefficient $\rho$;

a ninth multiplier, for multiplying the second frequency offset metric by a second coefficient $\alpha(1-\rho)$;

a fifth adder, for adding the first frequency offset metric multiplied by the first coefficient $\rho$ and the second frequency offset metric multiplied by the second coefficient $\alpha(1-\rho)$; and a second maximum value circuit, for obtaining a maximum value among the output of the fifth adder as the frequency offset of the receiving signal.

5. The orthogonal frequency division multiplexing system according to claim 4, wherein the first frequency offset synchronization circuit comprises:

a fourth delay circuit, for delaying the receiving signal for a first predetermined time;

a third conjugate circuit, for obtaining complex conjugate of the delayed receiving signal;

a tenth multiplier, for multiplying the receiving signal without being delayed, the output signal of the third conjugate circuit and a first frequency offset item $e^{j2\pi\epsilon}$;

a fourth real-part circuit, for obtaining the real-part of the complex number output signal of the tenth multiplier; and a fourth accumulator, for accumulating the output signal of the fourth real-part circuit by a plurality of time points to calculate the first frequency offset metric, wherein the number accumulated is the length of the cyclic prefix.

6. The orthogonal frequency division multiplexing system according to claim 4, wherein the second frequency offset synchronization circuit comprises:

an eleventh multiplier, for multiplying the receiving signal by a second frequency offset item $e^{-j2\pi\epsilon k/N}$;

a fifth real-part circuit, for obtaining the real-part for the complex number of the output signal of the eleventh multiplier;

a fifth delay circuit, for delaying the receiving signal for a first predetermined time;

a fourth conjugate circuit, for obtaining the complex conjugate of the output signal of the fifth delay circuit;

a twelfth multiplier, for multiplying the output signal of the fourth conjugate circuit by a third frequency offset item $e^{-j2\pi\epsilon(k+N)/N}$;

a sixth real-part circuit, for obtaining the real-part of the complex number signal output by the twelfth multiplier;

a sixth adder, for adding the output signal of the fifth real-part circuit and the output signal of the sixth real-part circuit;

a thirteenth multiplier, for multiplying the PN-sequence receiving signal of the receiving signal and the output signal of the fifth real-part circuit;

a fourteenth multiplier, for multiplying the PN-sequence receiving signal of the receiving signal and the output signal of the sixth adder;

a sixth accumulator, for accumulating the output signal of the thirteenth multiplier by a plurality of lengths, wherein the number accumulated is the length of the cyclic prefix plus the first predetermined time;

a seventh accumulator, for accumulating the output signal of the fourteenth multiplier by a plurality of lengths, wherein the number accumulated is the length of the cyclic prefix;

a fifteenth multiplier, for multiplying the output signal of the seventh accumulator by the first coefficient $\rho$;

a sixteenth multiplier, for multiplying the output of the sixth accumulator by a third coefficient $\alpha(1+\rho)$; and a seventh adder, for adding the output signal of the fifteenth multiplier and the output signal of the sixteenth multiplier.

7. An orthogonal frequency division multiplexing system with PN-sequence, comprising:

a modulate circuit, for modulating a transmitting terminal signal to a complex number frequency domain signal at a transmitting terminal;

an Inverse Fast Fourier Transformer, for transforming the complex number frequency domain signal at the transmitting terminal to a complex number time domain signal at the transmitting terminal;

a PN-sequence generating circuit, for generating a PN-sequence signal;

a cyclic prefix inserter, for inserting cyclic prefixes to the complex number time domain signal at the transmitting terminal and the PN-sequence signal, respectively;

a first adder, for adding the complex number time domain signal having cyclic prefixes at the transmitting terminal and the PN-sequence signal having cyclic prefixes to form a transmitting signal;

a time and frequency synchronization device, for receiving a receiving signal formed by the transmitting signal though a channel, and for calculating and compensating the timing offset and frequency offset of the receiving signal according to cyclic prefixes and the PN-sequence signal;

a cyclic prefix remover, for removing the cyclic prefix of the receiving signal compensated by the time and frequency synchronization device;

a Fast Fourier Transformer, for transforming the receiving signal without the cyclic prefix to a complex number frequency domain signal at a receiving terminal; and a demodulate circuit, for demodulating the complex number frequency domain signal at the receiving terminal to a receiving terminal signal, wherein the time and frequency synchronization device comprises a timing offset synchronization device, a frequency offset synchronization device and a compensation device, the timing offset synchronization device is used for calculating the timing offset of the receiving signal, the frequency offset synchronization device is used for calculating the frequency offset of the receiving signal, and the compensation device is used for compensating the receiving signal according to the timing offset and the frequency offset, and wherein the frequency offset synchronization device comprises:

a first frequency offset synchronization circuit, for generating a first frequency offset metric formed by the cyclic prefix;

a second frequency offset synchronization circuit, for generating a second frequency offset metric formed by the PN-sequence;

an eighth multiplier, for multiplying the first frequency offset metric by a first coefficient $\rho$;

a ninth multiplier, for multiplying the second frequency offset metric by a second coefficient $\alpha(1-\rho)$;

a fifth adder, for adding the first frequency offset metric multiplied by the first coefficient $\rho$ and the second frequency offset metric multiplied by the second coefficient $\alpha(1-\rho)$; and a second maximum value circuit, for obtaining a maximum value among the output of the fifth adder as the frequency offset of the receiving signal.

* * * * *